Dec. 5, 1944.  B. F. ARPS  2,364,121
POWER PICKUP SCOOP ATTACHMENT FOR TRACTORS
Filed April 19, 1943  3 Sheets-Sheet 1

INVENTOR.
BRUNO F. ARPS
BY  A.S.Krob
ATTORNEY

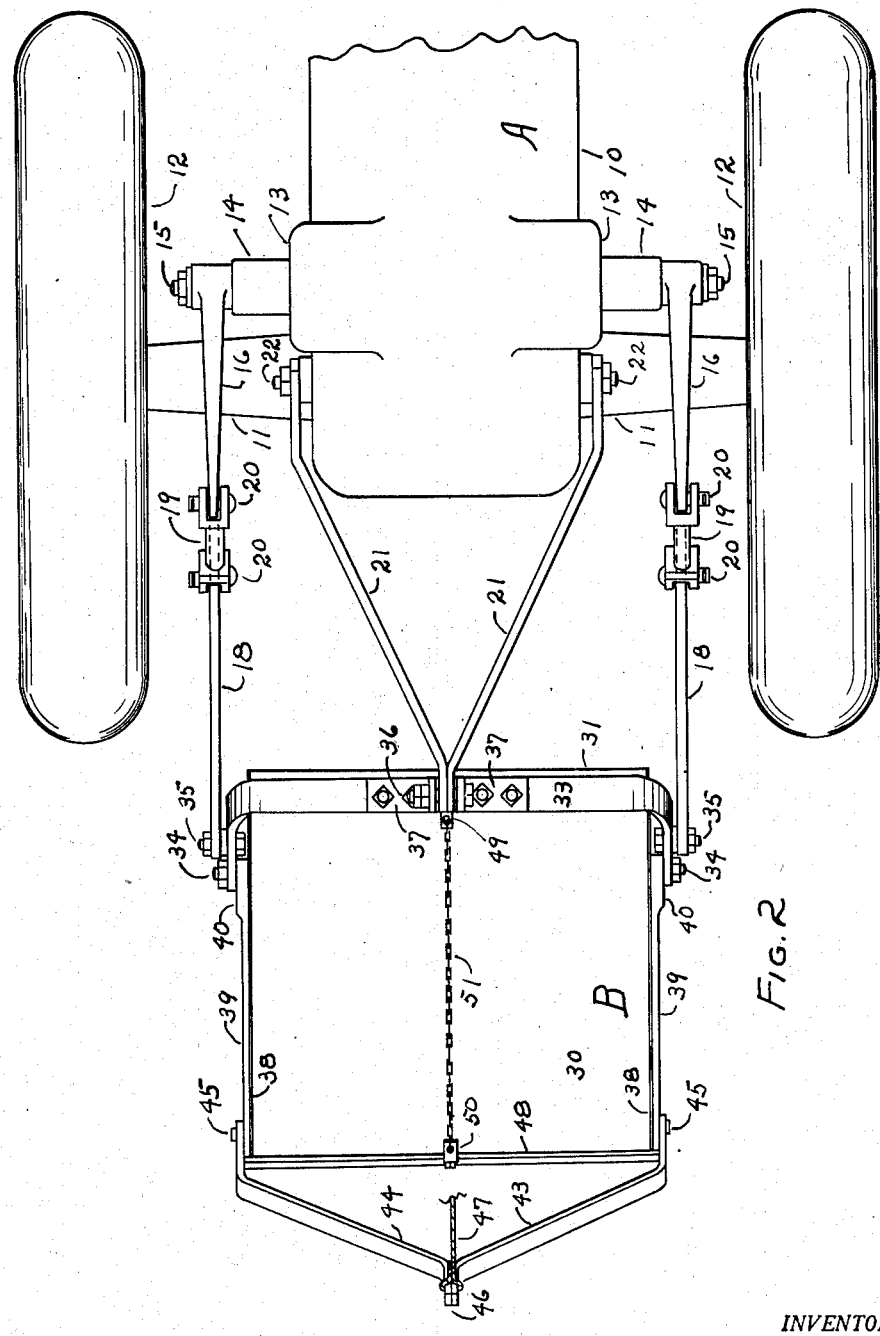

Dec. 5, 1944.   B. F. ARPS   2,364,121
POWER PICKUP SCOOP ATTACHMENT FOR TRACTORS
Filed April 19, 1943   3 Sheets-Sheet 3

INVENTOR.
BRUNO F. ARPS
BY
ATTORNEY

Patented Dec. 5, 1944

2,364,121

UNITED STATES PATENT OFFICE 2,364,121

POWER PICKUP SCOOP ATTACHMENT FOR TRACTORS

Bruno F. Arps, New Holstein, Wis., assignor to Arps Corporation, New Holstein, Wis., a corporation of Wisconsin Application April 19, 1943, Serial No. 483,573

7 Claims. (Cl. 37—128)

The present invention relates to a device commonly called dump scrapers which are adapted to be detachably connected to a tractor and being controlled by a power lifting device whereby the operator can conveniently control the picking up and dumping operations.

My invention is particularly adapted for tractors having preferably a hydraulic power lift which may be standard equipment and wherein the scraper is always under the complete control of the operator.

An object of my invention is to provide a scraper attachment for tractors which can be conveniently and quickly secured to and removed from the tractor without making changes in the tractor.

A still further object of the present invention is to provide a device which can be operated successfully without detracting the attention of the operator from the directional and speed controls of the tractor.

Generally stated, the objects of the present invention are to provide a device of the class which will move the maximum amount of dirt in the minimum length of time and in the most economical and convenient manner and to provide an attachment which can be manufactured at low cost and is reliable and durable.

The above mentioned objects are accomplished by means of parts, combinations of parts, or their equivalents, and mode of operation, as hereinafter set forth and claimed and shown in the accompanying drawings in which:

Fig. 2 is a top view of the device shown in Figure 1.

Figure 1:
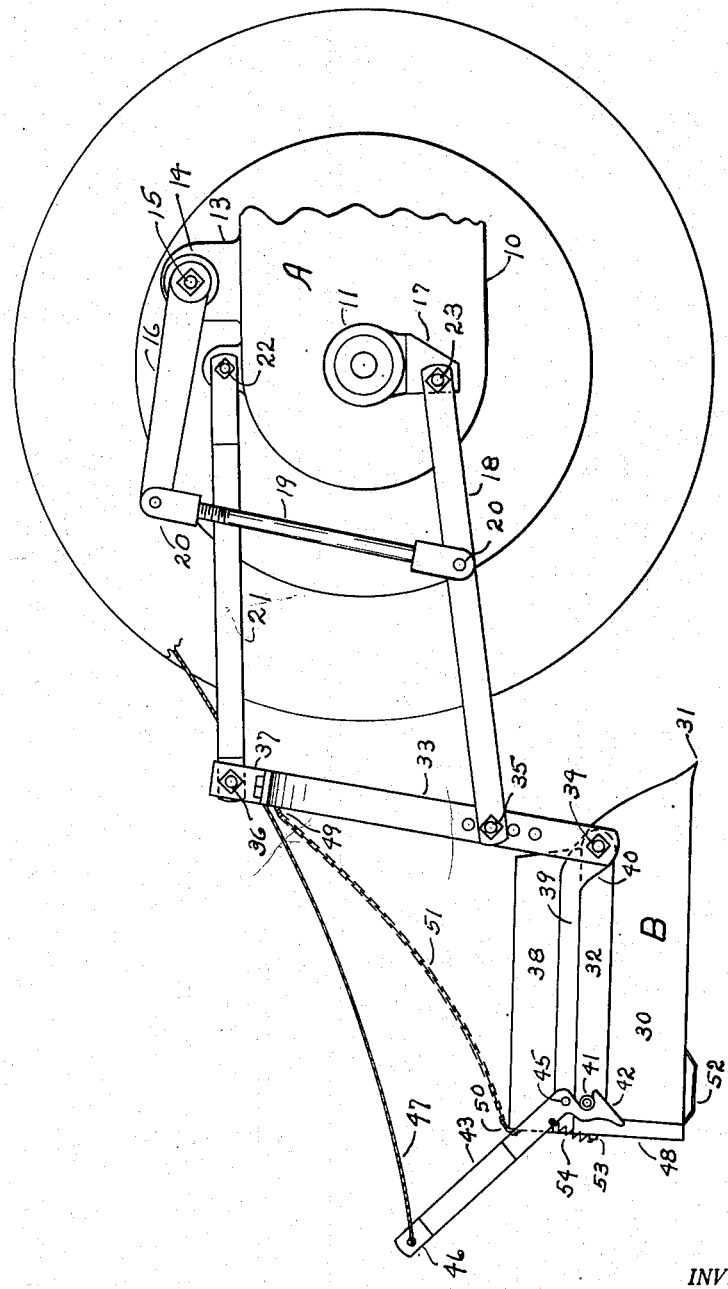
Fig. 1 is a side elevational view of the preferred form of my invention being shown as attached to a tractor.
Figure 4:
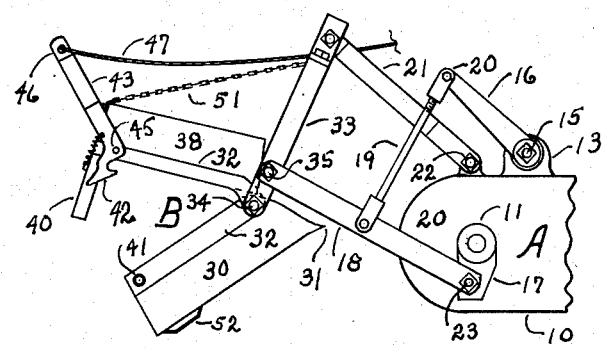
Fig. 4 is a view similar to Figure 3 after the scoop has been released for dumping the load.

The portion of the tractor shown is designated in its entirety by reference character A and the scoop attachment is designated in its entirety by reference character B.

Numeral 10 designates the rear portion of the tractor frame and 11—11 designate the rear axle housings through which the axle shafts extend and on the ends of which ground wheels 12 are mounted. Numerals 13—13 designate a projection on the frame of the tractor and 14—14 designate extensions to this projection, through which the power lifting shaft 15 protrudes from opposite ends.

On the ends of shaft 15 I mount rearwardly extending arms 16—16. The power lift is adapted to oscillate the rear ends of these arms, the oscillating movement being under the control of a manually operated valve.

On the bottom of members 11 and in the proper transverse position, I secure draw bar brackets 17 to which the forward ends of draw bars 18 are pivotally attached as at 23. The rear ends of arms 16 are operatively connected to draw bars 18 by means of links 19—19 as at 20—20.

I provide control arms 21—21 which are pivotally attached to the frame of the tractor as at 22—22. These arms are shaped as shown in Figure 2, the rear ends contacting for a short distance.

I provide a U-shaped scoop 30 having a front cutting edge 31 with an open rear end, the upper edges of this scoop being strengthened by means of plates 32—32 (one not shown). I provide an inverted U-shaped member 33 through the lower ends of which a bolt 34 extends.

Draw bar 18 at its rear end is operatively connected to the legs of member 33 by means of bolts 35. The rear end of draw bar 18 may be adjusted vertically relatively to member 33 by means of a series of apertures as illustrated or the rear end of member 18 may be operatively connected to the device by means of bolt 34 similar to the connection shown in Figure 5.

The rear ends of members 21 are operatively connected to the cross bar of member 33 by means of a bolt 36 and brackets 37. It will be seen that members 18 and 21 are positioned so as to provide substantially a parallel movement for member 33 when the power lifting mechanism is operated.

I provide open front extensions 38—38 for members 30 which are adapted to lie on members 32 and are provided with strengthening bars 39—39 which, at their forward ends, extend outwardly and downwardly as at 40 and having an aperture through which bolt 34 rotatably extends. Rollers 41 are suitably rotatably mounted on the rear ends of members 32.

I provide hooks 42 which are secured to the lower ends of arms 43 and 44, these arms being pivoted to member 39 as at 45. The upper portions of members 43 and 44 converge as shown in Figure 2, their ends contacting for a short distance as at 46 and having corresponding apertures to which a rope 47 is attached. The rope extends forwardly and upwardly as indicated in the figures so it may be easily reached by the operator of the tractor. Members 38 and 39 are connected together at their rear ends by means of an end gate 48 which is extended downwardly far enough to form a closure for the rear end of member 30, thus forming an open front end extension frame for the scoop.

A bracket 49 is provided on the main body of member 33 and another bracket 50 is provided on the upper edge of member 48 midway its length. A chain 51 forms an operating connection between members 49 and 50 so when the scoop is lifted, member 38 will be lifted at both ends substantially as illustrated, however, when the scraper is in a loading position chain 51 is slack, therefor when the power lift is first operated to lift the scraper its front end at 31 will be first lifted until the chain is taut, after which the entire scraper will be lifted.

It will be seen that members 30 and 38 are pivoted to the lower ends of the legs of member 33 by means of bolts 34 and that these two members are pivoted together at their forward ends by these same bolts. Member 30 is held to member 38 during the lifting operation by means of members 41 and 42. When it is desired to dump the load in the scoop, all that is necessary is to pull rope 47 sufficient to disengage hooks 42 from rolls 41. Clearly the scoop may be lifted to any desired height and the tractor moved to a point where the load is to be dumped. The rope may then be pulled to dump the load either while the tractor is standing or in motion. If it is desired to spread the load being dumped, the scoop may be lifted just high enough so end gate 48 will act to spread the load as it leaves the scoop.

When it is desired to reload the scoop, it is again lowered to the ground. Runners 52 are provided on the rear end of the scoop which act to give the scoop down-suck and to push the scoop into its locked and loading position as indicated in Figure 1.

In order to insure holding hooks 42 in their engaged position and to limit their rearward movement, I provide bars 53 which are secured to member 48 and extend outwardly far enough to contact member 42 when it is pulled to a disengaging position by rope 47. A spring 54 is preferably provided which acts to insure holding member 42 in its operating position except when the rope is pulled.

Figure 3:
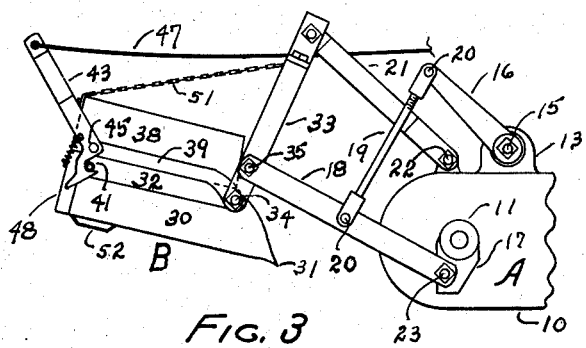
Fig. 3 is a side elevational view of the device shown in Figures 1 and 2 after the scoop has been lifted.

In Figures 1, 2 and 3, chain 51 will act as hereinbefore described but in dumping with the scoop close to the ground, member 38 might be lifted somewhat so as to limit the scattering action of the end gate 48.

Figure 5:
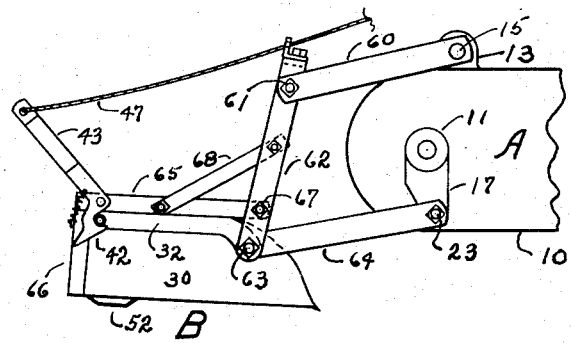
Fig. 5 is a view similar to Figure 3 but of a modification.

In Figure 5, I illustrate a modification wherein the end gate cannot be lifted by contact with the dumped load. In this design, rearwardly extending arms 60—60 (one not shown) are secured to the ends of shaft 15. The rear ends of these arms are pivotally mounted as at 61—61 (one not shown) to the legs of inverted U-shaped member 62, this member being similar to member 33 in the other figures. Member 62 is pivotally mounted to member 32 by means of a bolt 63, the bolt extending through the rear end of draw bar 64 and the lower ends of the legs of member 62.

Extension frame 65 is somewhat similar to extension frame 38 in the other figures having a rear end gate 66 and being secured to member 62 at its forward ends as at 67—67 (one not shown) and rigidly secured to member 62 by means of braces 68 as clearly indicated.

The operation of the device will be the same as the device shown in Figures 1 through 4 except that the end gate 66 will not lift independent of member 62 and the power lift may be used to positively spread the unloaded material as desired.

In the design shown in Figure 5, the down-suck of the scoop is fixed; whereas in the design shown in Figures 1 through 4, the down-suck of the scoop may be increased by adding down pressure to member 33. In either event, it will be seen that I have provided a very simple, easily operated, strong and efficient scoop attachment for tractors which is somewhat similar to the attachment disclosed in my copending application Serial Number 378,909, filed February 14, 1941, now Patent No. 2,317,578, dated April 27, 1943, having the additional advantage over this design in that the scoop may be lifted clear of the ground for transporting a load. An advantage of the present design is that one can back the tractor and dump the load a considerable distance and on an elevation in rear of the tractor.

Clearly many minor detail changes may be made without departing from the spirit and scope of the present invention, as recited in the appended claims.

Having thus shown and described my invention, I claim:

1. A device of the class described, comprising a tractor having transversely spaced rearwardly extending draw bars, a power lift secured to the tractor frame and having transversely spaced rearwardly extending arms operatively connected to said draw bars for raising and lowering the rear ends thereof, a generally vertically arranged inverted U-shaped member operatively connected at its lower ends to the rear ends of said draw bars and having a link forming operating connections to the tractor for a generally vertical movement of the U-shaped member, a scoop having an open rear end being positioned between the lower ends of said U-shaped member and being hinged thereto, a supplemental frame adapted to normally close the open rear end of said scoop and being hingedly secured at its forward end to the scoop, means adapted to limit the down movement of the rear end of said supplemental frame relative to said U-shaped member, whereby when said U-shaped member is lifted, the front end only of said scoop will be lifted to thereby dump the load.

2. A device of the class described, comprising a tractor having transversely spaced rearwardly extending draw bars, a power lift secured to the tractor frame and having transversely spaced rearwardly extending arms operatively connected to said draw bars for raising and lowering the draw bars, a generally vertically arranged inverted U-shaped member operatively connected at its lower ends to said draw bars and having a link forming operating connections to the tractor for generally vertical movement of the U-shaped member, a scoop having an open rear end being positioned between the lower ends of said U-shaped member and hinged thereto, an open front end frame adapted to normally close the open rear end of said scoop and lie on the side members of the scoop and being hingedly secured at its forward ends to said scoop, means adapted to limit the down movement of the rear end of said frame relative to said U-shaped member, detachable latch members adapted to normally hold the rear ends of said scoop and frame together, means for breaking said detachable connection to dump the load when the scoop is lifted.

3. A device of the class described, comprising a tractor having transversely spaced rearwardly extending draw bars, a power lift secured to the tractor frame and having transversely spaced rearwardly extending arms, a generally vertically arranged inverted U-shaped member operatively connected to the rear ends of said draw bars and arms for generally vertical movement of the U-shaped member, a scoop having an open rear end positioned between the lower ends of said U-shaped member and hinged thereto near the forward end of the scoop, an open front end frame adapted to normally close the rear end of said scoop and being rigidly secured at its forward end to said U-shaped member, whereby when said U-shaped member and the frame are lifted, the front end of said scoop will be lifted to thereby dump the load.

4. A device of the class described, comprising a tractor having transversely spaced rearwardly extending draw bars, a power lift secured to the tractor frame and having transversely spaced rearwardly extending arms, a generally vertically arranged inverted U-shaped member operatively connected to the rear ends of said draw bars and arms for generally vertical movement of the U-shaped member, a scoop having an open rear end positioned between the lower ends of said U-shaped member and hinged thereto near the forward end of the scoop, an open front end frame adapted to normally close the rear end of said scoop and being rigidly secured at its forward end to said U-shaped member, detachable latch members adapted to normally hold the rear ends of said scoop and frame together, means for breaking said detachable connection to dump the load when the scoop is lifted.

5. A device of the class described, comprising a tractor having transversely spaced rearwardly extending draw bars, a power lift secured to the tractor frame and having transversely spaced rearwardly extending arms, a generally vertically arranged inverted U-shaped member operatively connected to the rear ends of said draw bars and arms for generally vertical movement of the U-shaped member, a scoop having an open rear end positioned between the lower ends of said frame and hinged thereto near the forward end of the scoop, an open front end frame adapted to normally close the rear end of said scoop and being hinged at its front end to said U-shaped member and means secured to said frame adapted to limit the down movement of its rear end relative to said U-shaped member, detachable latch members adapted to normally hold the rear ends of said scoop and frame together, means for breaking said detachable connection to dump the load when the scoop is lifted.

6. A device of the class described, comprising a tractor having transversely spaced rearwardly extending draw bars, a power lift secured to the tractor frame and having transversely spaced rearwardly extending arms, a generally vertically arranged inverted U-shaped member operatively connected to the rear ends of said draw bars and arms for vertical movement of the U-shaped member, a scoop having an open rear end positioned between the lower ends of said U-shaped member and hinged thereto near the forward end of the scoop, an open front end frame adapted to normally close the rear end of said scoop and being hinged at its front end to said scoop and means on said U-shaped member and frame adapted to determine the position of the rear end of the frame relative thereto, detachable latch members adapted to normally hold the rear ends of said scoop and frame together, means for breaking said detachable connection to dump the load when the device is lifted.

7. A device of the character described comprising a tractor having a power lift, transversely spaced rearwardly extending drawbars horizontally hinged at their front ends to the tractor, elements hinged at their lower ends to the rear ends of said drawbars, means connecting the upper end of said elements to the tractor to thereby hold the elements in a generally vertical position, operating connections from said power lift adapted to determine the vertical position of said elements, a scoop having an open rear end positioned between the lower ends of said elements and being hinged near its front thereto, a frame carried by said elements having a rear end member adapted to act as an endgate for said scoop, a latch on the rear end of said frame adapted to engage the rear end of the scoop, whereby when said latch engages the scoop and the elements are lifted, the scoop will be lifted and held in a generally horizontal position, means for disengaging said latch whereby the scoop is free to fall by gravity at its rear end.

BRUNO F. ARPS.